United States Patent Office.

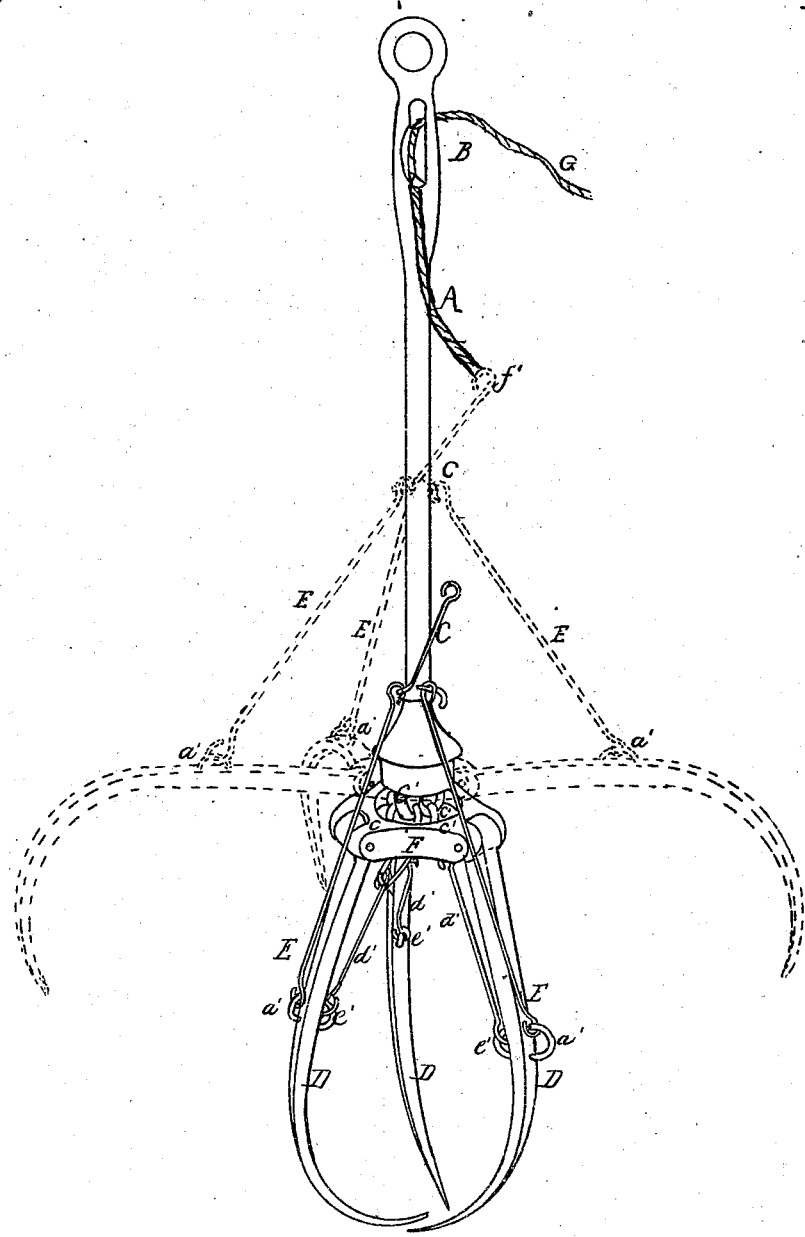

HARVEY D. PALMER, OF LEONIDAS, MICHIGAN, ASSIGNOR TO S. O. KAEMPFER, DAVID G. WILLIAMS, AND WILLIAM C. WILSON, OF ELKHART, INDIANA.

Letters Patent No. 78,816, dated June 9, 1868; antedated June 4, 1868.

IMPROVEMENT IN HORSE HAY-FORKS

The Schedule referred to in these Letters Patent and making part of the same.

TO ALL WHOM IT MAY CONCERN:

Be it known that I, HARVEY D. PALMER, of Leonidas, in the county of St. Joseph, and State of Michigan, have invented a new and improved Hay-Fork; and I do hereby declare that the following is a full and exact description thereof, reference being had to the accompanying drawings, and to the letters of reference marked thereon.

Figure 1 is a perspective view of my improvement, in which—

A is the standard, having a roller, B, secured in an opening in its upper part, to which and the eye $f'$ of the encircling rod C, a cord, G, is attached for operating the prongs D D D, through the rods E E E, which are connected to the prongs, as shown at $a'$ $a'$ $a'$, through eyes on the outer surface of the prongs. These prongs are pivoted and play freely in the head-piece F, which is slotted to receive the prongs, which have their seats in the apertures thus provided. In a projection, $b'$, at the bottom of the standard A, are three openings, into each of which are inserted links $c'$ $c'$ $c'$. Into these links are secured rods $d'$ $d'$ $d'$, which are fastened at their lower ends into eyes $e'$ $e'$ $e'$, situated on the inner surfaces of the prongs, and about midway of their length.

It will thus be seen, by this construction, that the prongs D D D may be easily operated through the encircling rod C, by means of the rods E E E, the prongs falling, by their own weight, to the distance they are permitted to by the operator, who has hold of the rope G attached to the encircling rod, and over the roller. The whole apparatus is lowered for attachment to the mass, (hay, &c.,) below, when the fork is properly secured to its load, which is done by pressing the prongs into the mass to be moved; it is then elevated to the proper height, and suspended over the place desired for storage of the material. The operator then by pulling the cord G over the roller B, expands the prongs through their connections, and thus the fork is freed from its burden, and is ready for renewed operation.

Having thus described my invention, what I claim as new, and desire to secure by Letters Patent, is—

The movable head-piece F, to which the prongs D are pivoted, in combination with the standard A, link $c'$, and rods $d'$ and E, substantially as and for the purpose set forth.

HARVEY D. PALMER.

Witnesses:
 ISAAC D. TOLL,
 THOMAS W. BUCK.